United States Patent [19]

Vdoviak

[11] Patent Number: 5,020,318
[45] Date of Patent: Jun. 4, 1991

[54] AIRCRAFT ENGINE FRAME CONSTRUCTION

[75] Inventor: John W. Vdoviak, Marblehead, Mass.

[73] Assignee: General Electric Company, Lynn, Mass.

[21] Appl. No.: 117,187

[22] Filed: Nov. 5, 1987

[51] Int. Cl.⁵ ............................ F02K 3/02; F02K 3/08
[52] U.S. Cl. ...................................... 60/226.1; 60/261
[58] Field of Search ................ 60/226.1, 261, 262, 60/264, 39.75, 39.83, 749, 39.31, 751; 415/115, 142

[56] References Cited

U.S. PATENT DOCUMENTS

| | | | |
|---|---|---|---|
| 2,603,945 | 7/1952 | Brown | 60/261 |
| 2,674,845 | 4/1954 | Pouchot | 60/261 |
| 2,744,722 | 5/1956 | Orr . | |
| 2,763,427 | 9/1956 | Lindsey . | |
| 2,789,416 | 4/1957 | Mirza . | |
| 2,799,991 | 7/1957 | Conrad . | |
| 2,961,150 | 11/1960 | Pirtle . | |
| 2,963,857 | 12/1960 | Egbert et al. . | |
| 3,009,317 | 11/1961 | Meyer et al. | 60/261 |
| 3,062,006 | 11/1962 | Egbert et al. . | |
| 3,299,632 | 1/1967 | Wilde et al. . | |
| 3,369,366 | 2/1968 | Howald | 60/39.83 |
| 3,595,024 | 7/1971 | Kohler et al. | 60/261 |
| 3,750,402 | 8/1973 | Vdoviak et al. | 60/261 |
| 4,173,120 | 11/1979 | Grosjean et al. | 415/115 |
| 4,236,870 | 12/1980 | Hucul, Jr. et al. | 415/115 |
| 4,335,573 | 6/1982 | Wright . | |
| 4,416,585 | 11/1983 | Abdel-Messeh | 415/115 |
| 4,445,339 | 5/1984 | Davis, Jr. et al. | 60/749 |
| 4,490,973 | 1/1985 | Kinsey | 60/261 |

FOREIGN PATENT DOCUMENTS

| | | |
|---|---|---|
| 768041 | 7/1949 | Fed. Rep. of Germany . |
| 1035814 | 8/1953 | France . |
| 1093961 | 5/1955 | France . |
| 906865 | 9/1962 | United Kingdom . |

OTHER PUBLICATIONS

Irwin E. Treager, *Aircraft Gas Turbine Engine Technology*, 1979, pp. 170–172.

Primary Examiner—Louis J. Casaregola
Attorney, Agent, or Firm—Francis L. Conte; Nathan D. Herkamp; Jerome C. Squillaro

[57] ABSTRACT

A gas turbine engine of the type having generally cylindrical casings defining concentric bypass and turbine discharge passages including a support structure in the turbine discharge passage. The support structure is cooled with low pressure compressor discharge air through a scoop located in the bypass gas passage. The support structure includes a plurality of radial fairings, each of which includes a discharge chute which is approximately perpendicular to its respective fairing. The discharge chutes each communicate with the compressor discharge cool air flow in its respective fairing so as to provide a discharge flow in the form of a stratified annulus to cool downstream members which are aligned with the discharge chutes. The cooling air further reduces the temperature of the downstream gases so as to reduce the potential for flashback in the engine. The aerodynamic form and placement of the discharge chutes provide enhancements to the operation of the diffuser, of which the support structure is a part.

29 Claims, 6 Drawing Sheets

AIRCRAFT ENGINE FRAME CONSTRUCTION

CROSS REFERENCE TO RELATED APPLICATION

This application is related to copending application Ser. No. 117,183 filed concurrently herewith and assigned to the same assignee as this invention. This invention relates to a frame construction including means for discharging cooling air for cooling a downstream member.

BACKGROUND OF THE INVENTION

This invention relates in general to gas turbine engines of the type having generally concentric cylindrical casings defining a bypass air passage and turbine discharge passage and to a support structure located downstream of the turbine discharge passage.

One form of gas turbine jet engine is the turbofan, sometimes called the "bypass" engine. Such engines include an annular bypass air passage, or simply bypass duct, between an inner liner and the jet engine casing. The discharge air from a low pressure compressor is typically divided between the bypass duct air and a gas generator including a high pressure compressor, combustor and at least one turbine. Hot turbine discharge gases and the cold bypass air are rejoined or mixed downstream of the turbine by means of an annular device called a mixer. In addition to the foregoing, it is known for jet engines to use a means of thrust augmentation which is typically referred to as an afterburner. Thus, it is known that after the fuel/air mixture has passed through the combustion chamber and turbine, there remains some additional thrust potential with hot turbine discharge gases since not all of the available oxygen has been consumed. Therefore with the addition of more fuel and provision of means for igniting the enriched fuel/gas mixture in the afterburner, additional thrust may be realized.

Higher turbine inlet temperatures of more advanced engines result in higher downstream temperatures at the turbine outlet, which may approach turbine inlet temperatures of some current engines. It is therefore important to provide improved cooling of structural frame members as well as other devices in the hot exhaust path and to provide an environment in the case of afterburner engines to decrease the tendency for the occurrence of flashback. Flashback is the movement of the afterburner flame front in an upstream direction past its designed for location at the flameholder. The flashback tendency may increase as the flameholder inlet temperatures approach and surpass auto-ignition levels so that the high exhaust temperature poses not only a flameholder durability problem but a flashback operational limitation. Finally, in addressing these problems it is important not to create additional pressure losses through blockages or flow disturbances in the diffuser section of the afterburner which would degrade the overall performance of the engine.

Accordingly, one object of the present invention is to accommodate increased engine performance by providing an improved support structure for a gas turbine engine.

Another object of the invention is to provide for improved cooling of the support structure.

Another object of the invention is to provide for improved cooling of engine parts downstream from the support structure.

Another object of the invention is to provide an improved support structure for upgraded afterburner inlet diffuser performance.

Another object of the invention is to provide for improved operability of downstream flameholders in engines which include afterburners.

Another object of the invention is to provide a source of cooling air to downstream components in order to reduce the infrared detectability of such devices.

SUMMARY OF THE INVENTION

A support structure is described for a gas turbine engine of the type which includes generally cylindrical casings which define concentric bypass air and turbine discharge gas passages. The support structure includes inner and outer rings connected by radially extending hollow support struts. Each structural support strut is enclosed in a hollow protective fairing having means for discharging cooling air into the turbine discharge passage for obtaining higher engine efficiency.

In an exemplary embodiment of the invention, each fairing is formed with a discharge chute at its trailing edge wherein the discharge chute is generally perpendicular to the fairing. The support structure is mounted in the turbine discharge passage and each fairing is provided with low pressure compressor discharge or bypass air into its hollow interior chamber by means of at least one air scoop which is mounted in the bypass passage and which is in fluid communication with the hollow interior of each fairing. Thus, cooling air is ducted into the hollow interior of each fairing and exhausted out of the chute. The chutes are arrayed in an annular configuration and thereby provide an annular stratified flow of cooling air to downstream engine parts which may be aligned with the path of cooling air. Additionally, the support structure may be located in a diffuser section of the engine and the use of discharge chutes provides a controlled diffusion rate which provides for improved diffuser performance. Cooling is also enhanced by the low static pressure at the exit plane of the annular array of discharge chutes which increases cooling flow due to the high pressure differential with respect to the cooling air inlet of the struts. The durability of downstream afterburner components is enhanced because of the localized cooling air, and the tendency for flashback and auto-ignition to occur is reduced.

BRIEF DESCRIPTION OF THE DRAWINGS

The novel features believed characteristic of the invention are set forth in the appended claims. The invention, itself, in accordance with a preferred, exemplary embodiment, together with further objects and advantages thereof is more particularly described in the following detailed description taken in conjunction with the accompanying drawings in which:

DETAILED DESCRIPTION OF THE INVENTION

Figure 1:
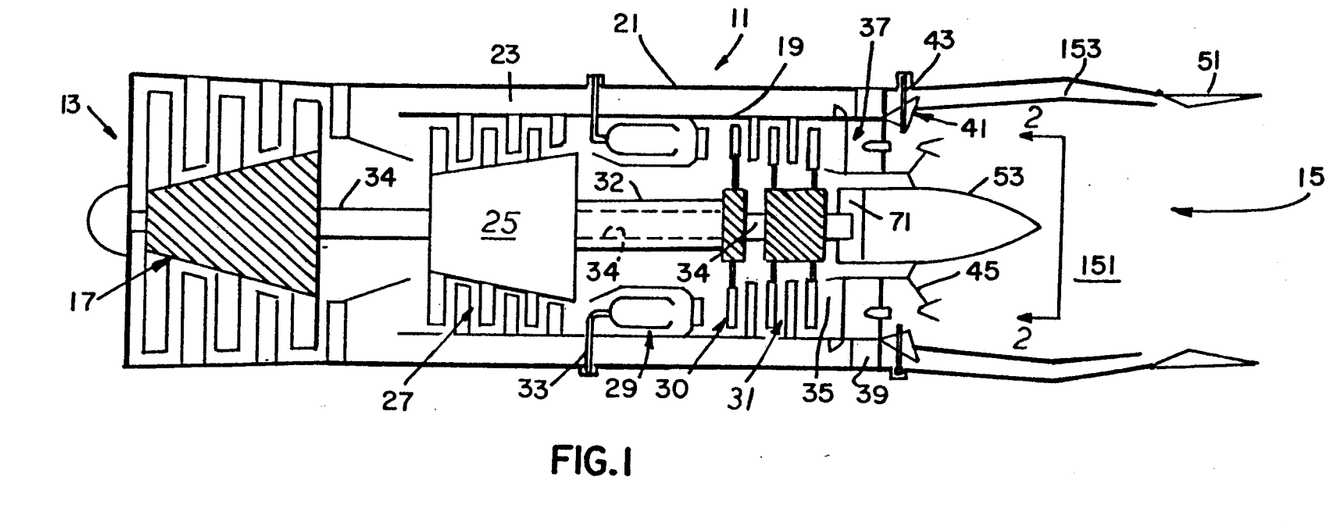
FIG. 1 is an elevation view of a gas turbine engine in cross section showing major components thereof.

FIG. 1 is a cross section view of a gas turbine engine 11. The engine 11 is an axial flow engine of the type which is referred to as a bypass or turbofan engine, although it should be appreciated that the present invention could be applied to other types of engines. The engine 11 includes an air intake 13 and an exhaust outlet 15, thus establishing the general flow direction through the engine. The intake 13 houses a conventional low pressure compressor (LPC) 17 at the forward end of the engine. Downstream of the LPC 17, the engine 11 is divided into two generally cylindrical casings including a radially inner casing 19 and a surrounding outer casing 21. Part of the LPC discharge flow is directed into an annular bypass air passage, or duct 23. The inner casing 19 includes a conventional gas generator 25 which comprises, in series connection, a high pressure compressor (HPC) 27, a combustor 29, a high pressure turbine (HPT) 30, and a low pressure turbine (LPT) 31. The HPT 30 drives the HPC 27, whereas the LPT 31 drives the LPC 17 through coaxial first and second shafts 32 and 34, respectively. Fuel is provided to the combustor 29 by means of fuel pipes 33. The volume downstream from the casing 19 may be considered as the turbine discharge passage, or outlet, 35.

An annular support structure, or simply support, 37, in accordance with one embodiment of the invention, is positioned at the turbine outlet 35 and will be described in greater detail with reference to the other FIGURES. An outer support member 39 of conventional design is positioned in the bypass duct 23. A conventional mixer 41, which may be of annular or daisy (radial lobe) configuration, is provided between the bypass duct 23 and the turbine outlet 35 for mixing cool LPC discharge air with hot turbine discharge gases. In the exemplary embodiment illustrated, the engine 11 includes a conventional afterburner 151, having a plurality of afterburner fuel pipes 43 for feeding fuel to the afterburner 151. At least one annular flameholder 45 is positioned downstream of the afterburner fuel pipes 43. But for the support structure 37, the remainder of the engine 11 is conventional, including an adjustable exhaust nozzle 51 and a centerbody 53 disposed in the turbine outlet 35 and afterburner 151.

Figure 2:
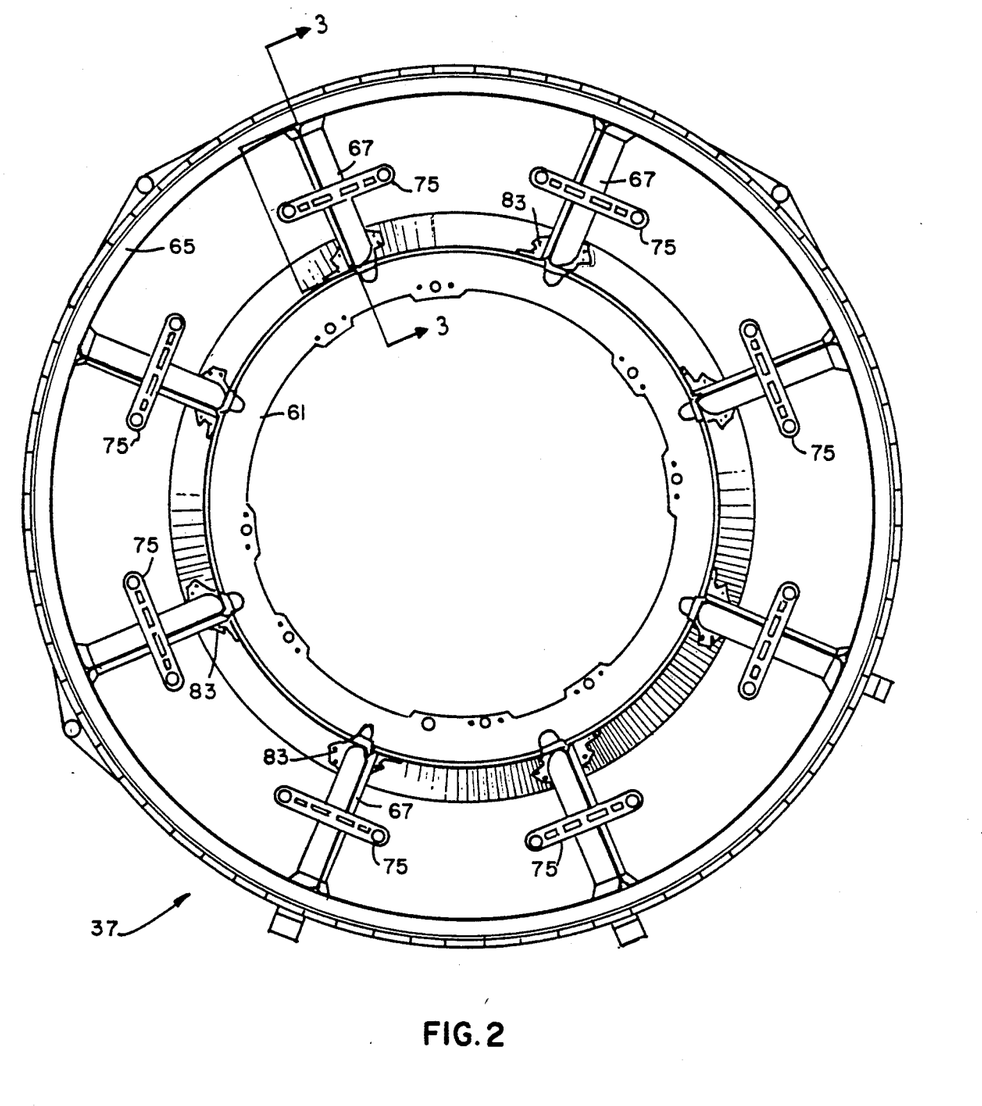
FIG. 2 is an end view of a support structure looking upstream into the engine from the afterburner inlet station.

An exemplary embodiment of the invention will be described with first reference to FIG. 2. FIG. 2 shows primarily the support 37, with the point of reference being a view looking upstream into the engine 11 from the afterburner 151, as shown by line 2-2 in FIG. 1. The support structure 37 comprises a radially inner ring 61 and a radially outer ring 65, connected together by a plurality of radial members or fairings 67 extending therebetween. The inner ring 61 supports a conventional rear engine bearing casing 71 (FIG. 1), whereas the outer ring 65 supports the casing 19. The support 37 is disposed in the turbine outlet 35 on the downstream side of the LPT 31. Each of the fairings 67 includes a wing or mixing chute 75, which will be described in greater detail during the following further description.

Figure 3:
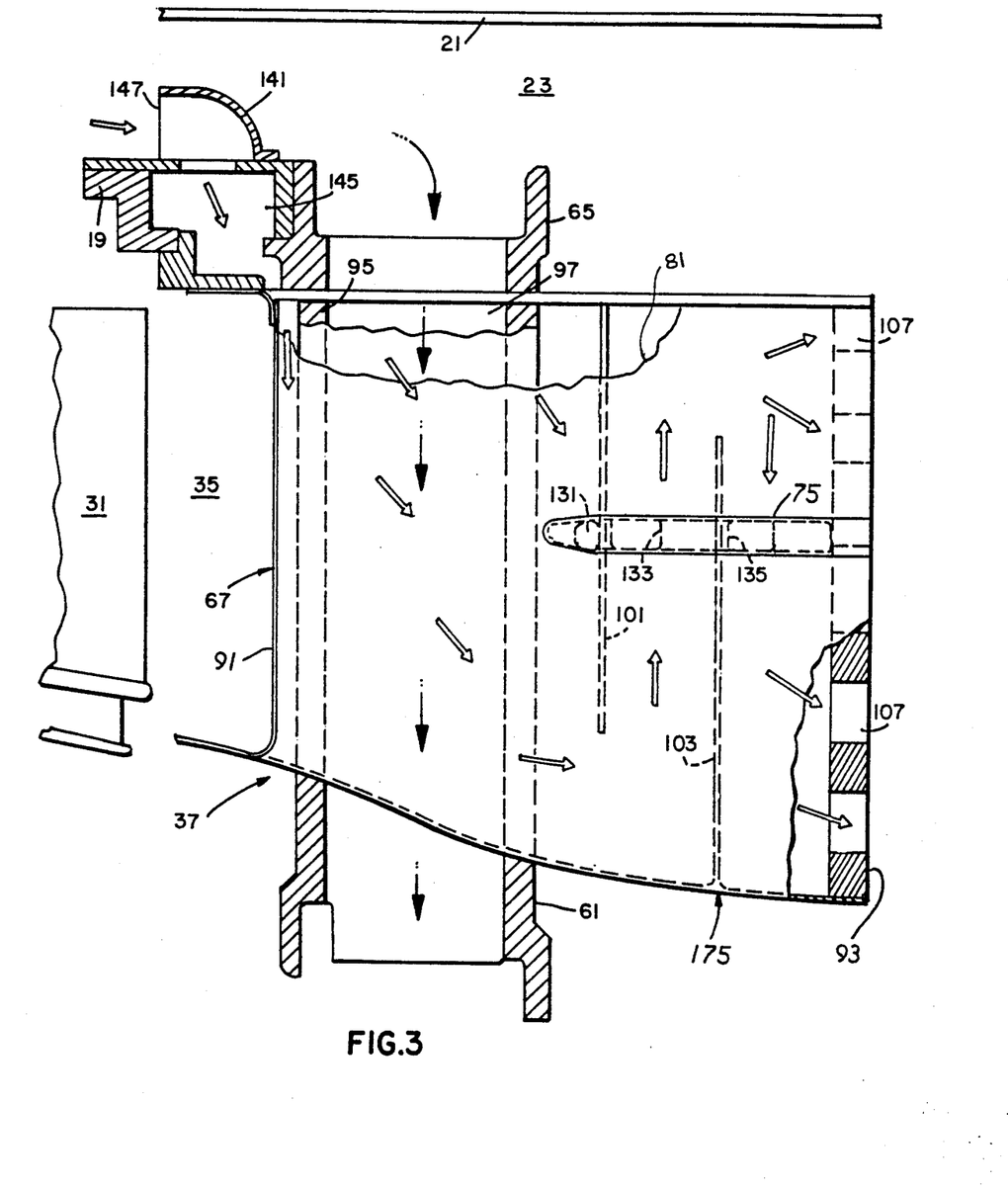
FIG. 3 is a cross section and partially cutaway illustration of a strut and fairing of the support structure in accordance with one embodiment of the present invention.

FIG. 3 is an elevation view in cross section of a portion of the support 37, showing, in particular, one of the fairings 67. The fairing 67 is shown as partially cut away so as to identify various fluid flowpaths. The fairing 67 is aligned with the gas discharge of the LPT 31 and is positioned in the turbine outlet 35. The inner casing 19 and the outer casing 21 are shown so as to define the annular bypass duct 23. The fairing 67 itself will be further described with respect to FIGS. 3, 4A, 5A and 5B so as to give a full appreciation as to its structure. The fairing includes an outer surface 81 in the shape of an airfoil which extends radially between the inner and outer rings 61, 65 of the support 37. As is best evident from FIG. 4A, each fairing 67 may include a radially inner skirt 83 and a radially outer skirt 85 which provide structures for fastening the fairing to the inner and outer rings 61, 65, respectively.

Figure 4A:
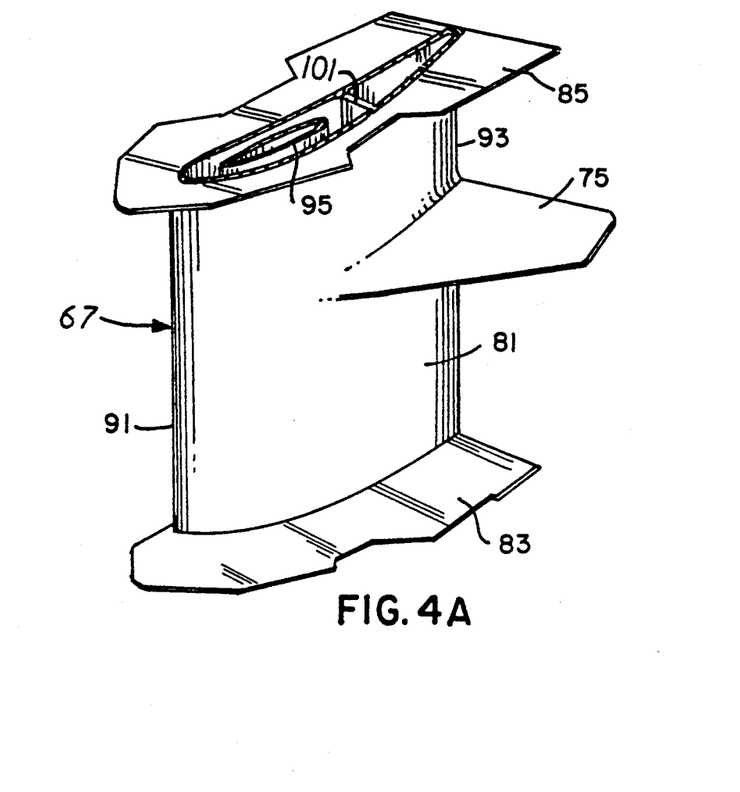
FIGS. 4A and 4B are views of the strut and fairing taken from near the front and the rear thereof.
Figure 4B:
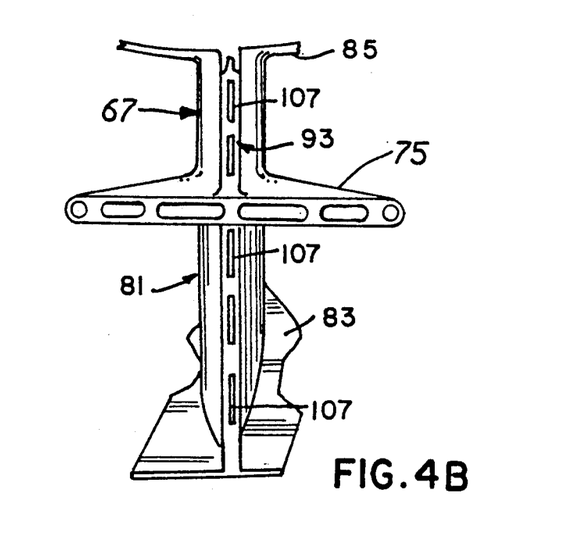
Figure 5A:
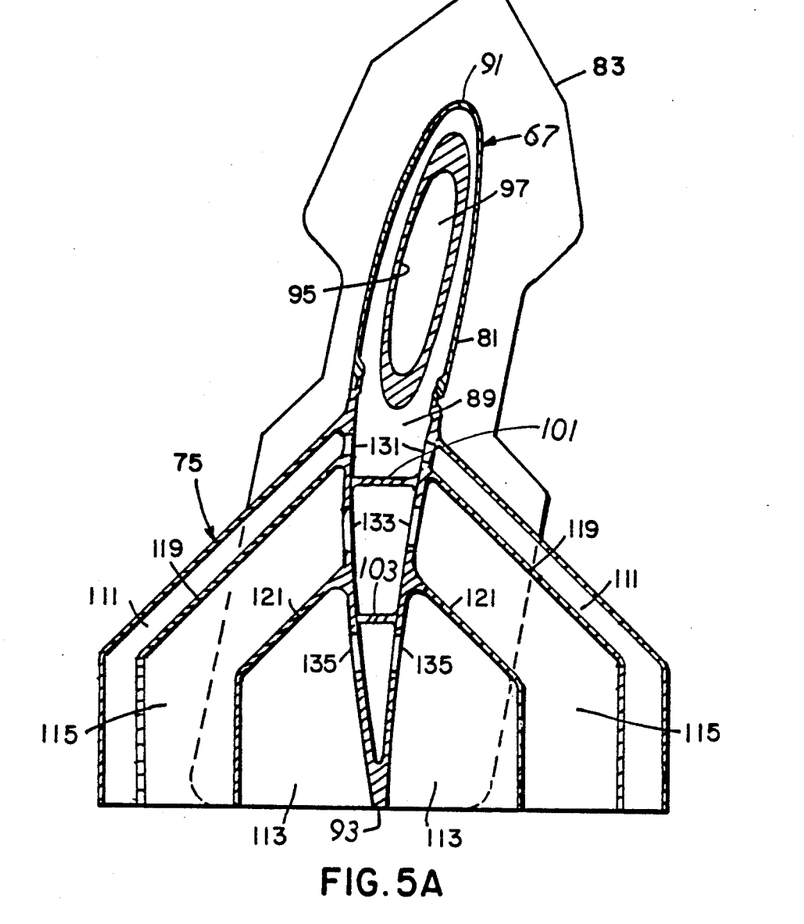
FIGS. 5A and 5B, respectively, are a plan view of the strut and fairing with the top section removed and an end view of a portion of a discharge chute of the fairing.
Figure 5B:
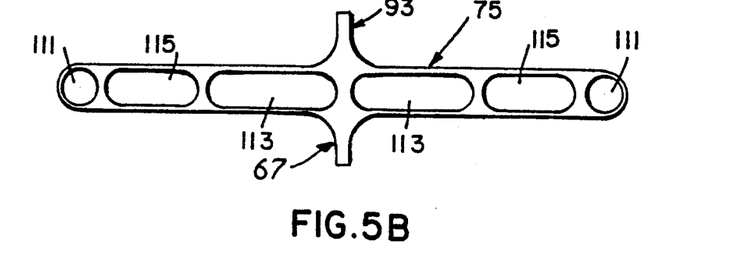

FIGS. 5A and 5B, in connection with FIGS. 3, 4A and 4B, best show that the fairing 67 includes a hollow inner chamber 89. The chamber 89 extends the entire axial width of the fairing from a leading edge 91 to a trailing edge 93 of the fairing. A hollow structural inner member, or support strut, 95 is positioned within the chamber 89 and attached to rings 61 and 65 to provide the structural support. The strut 95 includes an inner flowpath 97 through which cooling air (shown solid arrows) may be conventionally channeled to inner engine parts such as the rear bearing 71. This flowpath 97 may also be used as a channel for lubrication lines (not shown) which also benefit from the cooling airflow.

The chamber 89 of the fairing 67 also includes a pair of baffles which direct cooling air from the leading edge 91 to the trailing edge 93 of the fairing 67. An upstream baffle 101 is followed by a downstream baffle 103 with respect to the direction of the fluid flow through the fairing. An upstream baffle 101 extends from the radially outer edge of, and partially into, the fairing 67, whereas the downstream baffle 103 extends from the radially inner edge of, and partially into, the fairing 67 so as to create a circuitous flowpath from the leading edge 91 of the fairing 67 to the trailing edge 93 inside the fairing 67, as best seen in FIG. 3. The circuitous flowpath may be regarded as a three-pass cooling path within the fairing 67. As is clearly shown in FIG. 4B taken in combination with FIG. 3 a relatively small portion of the cooling flow is exhausted out the trailing edge 93 of the streamlined member through a plurality of air bleed holes 107 to ensure flow of cooling air through the fairing 67 for the cooling thereof.

Each fairing 67 is formed with means for discharging cooling air in a downstream direction, which means include the chute 75, as has been pointed out with reference to FIGS. 4A and 4B and which is more particularly shown in FIGS. 5A and 5B. FIG. 5A is a plan view of the fairing 67 with the radially outer skirt 85 removed for clarity. More specifically, and additionally with reference to FIG. 5B, the chute 75 includes a width dimension, taken in the circumferential direction, which is substantially greater than its height dimension taken in the radial direction. The chute 75 is in the form of a delta-wing which is made part of the fairing 67. The chute 75 is a cooling air discharge formed with the fairing 67 and generally perpendicular thereto. The lateral trailing edge of the chute 75 is preferably aligned generally perpendicularly to a radial axis, and the trailing edges of adjacent chutes 75 are disposed in a single axial plane, i.e. along a common circumference. This arrangement contributes in obtaining the preferred annulus of cooling air as described below, notwithstanding that the fairing 67 itself is typically skewed to the engine axial centerline for matching the discharge swirl angle of gas flow from the LPT 31.

The chute 75 may be formed with a plurality of flow channels comprising a pair of laterally outer circular channels 111 farthest from the fairing 67; a pair of laterally inner elongate channels 113 closest to the fairing 67; and a pair of middle elongate channels 115 between the outer and inner channels 111, 113. A first pair of divider walls 119 separates an outer channel 111 from its adjacent middle channel 115, whereas a second pair of divider walls 121 separates the inner channel 113 from its adjacent middle channel 115. An upstream set of holes 131 in the fairing 67 provides fluid communication between the fairing inner chamber 89 and the pair of outer channels 111; a midstream set of holes 133 in the fairing 67 provides fluid communication between the fairing inner chamber 89 and the pair of middle channels 115; and a downstream set of holes 135 in the fairing 67 provides fluid communication between the fairing inner chamber 89 and the pair of inner channels 113. The upstream holes 131 are located upstream of the upstream baffle 101, and the midstream holes 133 are located between the upstream and downstream baffles 101, 103. The downstream holes 135 are located on the downstream side of the downstream baffle 103.

The foregoing arrangement is for the creation of an optimum fluid flow and flow division and to assure the production of an annular flow pattern downstream of the support member, as will be described. FIG. 5B best outlines the outlet end of the chute 75 showing the flow channel pairs 111, 113 and 115. More specifically, the holes 131, 133 and 135 and the channels 111, 115 and 113 are sized for metering and channeling . airflow to the trailing edge of the chute 75 to ensure a generally uniform discharge of air along the width thereof for generating, along with adjacent chutes 75, an annulus of cooling air. Although a preferred embodiment of the chute 75 is disclosed, others may be used to ensure a uniform discharge of air therefrom.

Returning now to FIG. 3, an air scoop 141 is positioned in the bypass duct 23 for extracting a portion of the LPC discharge air and delivering it into the fairings 67. In a preferred embodiment, there may be one air scoop for each fairing 67. The scoop 141 is connected in flow communication with and provides air to a plenum 145, which, in turn, is connected in flow communication with and supplies air to the fairing inner chamber 89, as is shown by the open flow arrows. The cooling air then flows from and radially inwardly along the leading edge 91 of the fairing 67 around and radially upwardly along the upstream baffle 101, and then around the downstream baffle 103 to the trailing edge 93 in a three-pass flowpath until it is discharged from the trailing edge air bleed holes 107 and the chute 75 to cool downstream members yet to be described.

It is not necessary that each fairing 67 have its own air scoop. Therefore, fewer scoops 141 than there are fairings 67 may be used, and the plenum 145 may be extended circumferentially to an extent that it may supply air to adjacent fairings 67 or all of the fairings 67. It should further be noted that the cooling air for the inner flowpath 97 of the strut 95 is derived from other suitable means or similar scoops (not shown) which are positioned around the circumference of the support 37. It should also be noted that the airflow into the inner chamber 89 of the fairing 67 could be independently divided between the leading edge 91 and the trailing edge 93 of the fairing 67 such that the leading edge cooling air is ducted out from the radially inner portion of the support 37, as an alternate arrangement to the described three-pass flowpath.

Referring to FIGS. 2, 4B and 5B, it is clear that the discharge pattern of cooling air from the support 37 and its attached discharge chutes 75 will be primarily in the form of a stratified annulus or ring of cooling air. This is assured if each fairing 67 is equipped with the chute 75, as previously described, and if the chute 75 extends in both circumferential directions so as to have each half of the chute 75 extending approximately one-third of the distance between adjacent fairings 67. Thus, approximately two-thirds of the distance between adjacent fairings 67 will be taken up by adjacent chute portions, whereas one-third of the distance will be open.

In accordance with one of the objects of the present invention, the air exiting from the chutes 75 is used to cool downstream members in the aircraft engine. In accordance with another of the objects of the invention, the air exiting from the chutes 75 is used to reduce the potential for flashback in the afterburner 151. Referring back to FIG. 1, the afterburner 151 of the engine generally includes a combustion liner 153. Fuel which is delivered through the afterburner fuel pipes 43 is mixed with the turbine discharge gases and the LPC discharge air in the region just downstream from the support 37. The flameholder 45 is an annular structure which provides a sufficiently low velocity pocket to allow the afterburner fuel to ignite and the afterburner flame to remain stable. However, as the turbine exhaust temperatures rise because of higher turbine inlet temperatures, flashback margin or the tendency of the flame to remain suitably downstream is reduced. As the temperatures in the region of the flameholder inlet tend to increase, ignition of the fuel/gas mixture will tend to migrate upstream to the region forward of the flameholder 45, where it may cause damage to the flameholder 45. In addition, the tendency toward auto-ignition or spontaneous combustion is increased as turbine discharge temperatures rise.

According to one embodiment of the present invention, the support 37 is formed with means for discharging cooling air from the chutes 75 in an annular flow pattern in the downstream direction, as described above. The chutes 75 are radially positioned on the fairings 67 so as to form a cooling annulus of air along the turbine discharge gas streamlines aligned with the flameholder 45. This accomplishes a reduction in the temperature of the air in the vicinity of the flameholder 45, thereby increasing flashback margin and preventing the flame front from moving undesirably close to the flameholder 45. This embodiment of the invention also provides cooling of the downstream member; for example, the flameholder 45 which adds to the durability thereof because it will operate at lower temperature.

Thus, it is an important part of this embodiment of the invention to provide a flow of cooling air downstream of the support 37 to cool downstream members as well as to reduce gas temperatures in the region of the downstream member. In the latter case, the cooler temperatures increase the flashback margins and reduce the chance of auto-ignition.

It is also important to note that the downstream member should preferably be aligned as above described with the annular flow pattern of cooling air in order to maximize the cooling affect, and that, therefore, the downstream member is also aligned with the discharge chutes of the support member insofar as their radial position is concerned. The cooling air exiting the discharge chutes 75 is stratified in a narrow annular zone which is aligned with the flameholder inlet. In one embodiment, such alignment decreased the afterburner flameholder inlet gas temperature on the order of 80 degrees Fahrenheit.

Of course, other downstream members (other than flameholders) could be cooled, as, for example, other engine support members whose durability may be affected by the increased temperatures. It is also a part of this embodiment of the invention that the temperature of some downstream members may be lowered for the purpose of reducing their vulnerability to infrared (IR) detection.

The engine 11 also includes a diffuser 175 (FIG. 3), which is the flow channel extending from the LPT 31 to the flameholder 45. Inasmuch as turbine discharge gases are at a relatively high velocity, such velocity must be reduced by the diffuser to allow for proper combustion in the afterburner 151. It is in the diffuser 175 that the flow is allowed to decelerate in order to reduce the flow velocity which would otherwise result in flame instability in the afterburner. Diffusion must occur at relatively low rates in order to avoid undesirable flow separation at the walls thereof. The fairings 67 are disposed in the diffuser 175, and inasmuch as they are airfoil-shaped members having a diverging-converging shape they affect diffusion rate. The trailing edge portion of the fairing 67, i.e. the converging portion, increases the local rate of diffusion because of its converging shape. However, the use of the chutes 75 attached to the trailing edge portion of the fairings 67 adds flow blocking area to thus offset the otherwise local increase in diffusion rate, and thereby provides control of the diffusion rate. Furthermore, the chutes 75 act as flow splitters to improve the overall diffuser recovery. The splitters, or chutes 75, reduce the diffuser equivalent wall angle and thereby improve diffuser performance. In other words, a typical diffuser has spaced first and second walls each diverging at a preselected angle. By utilizing a splitter between the walls, two channels are created and the equivalent wall angle of each channel is less than the preselected angle because the splitter wall angle is zero. This reduction in wall angle decreases the diffusion rate, which is desirable. Additionally, the discharge flow from the chute 75 further streamlines the flow out of the diffuser in accordance with conventional daisy mixer criteria.

Figure 6A:
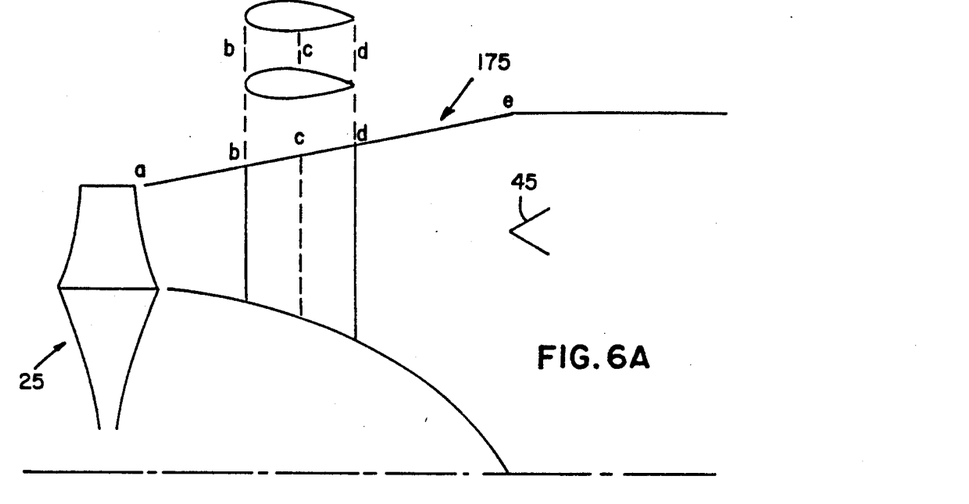
FIGS. 6A through 6C show in sketch and graph form the improved flow dynamics within a diffuser in accordance with one embodiment of the present invention.
Figure 6B:
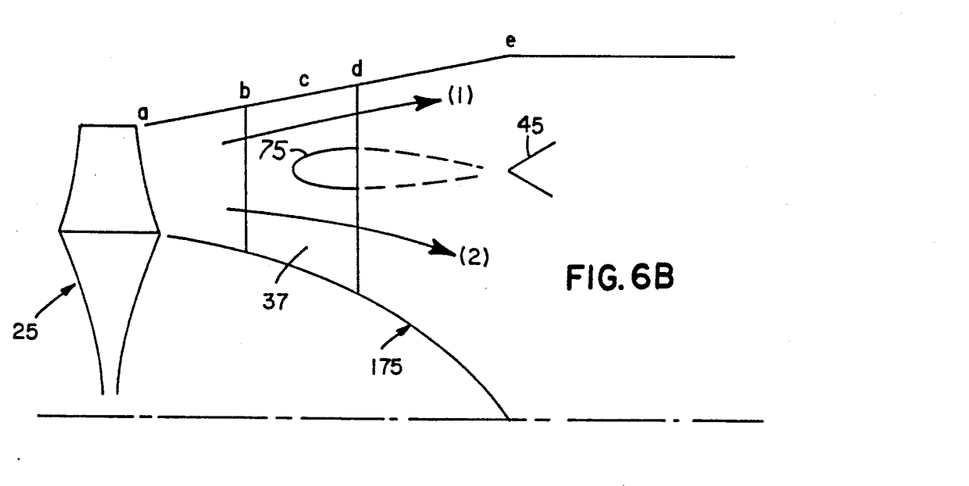
Figure 6C:
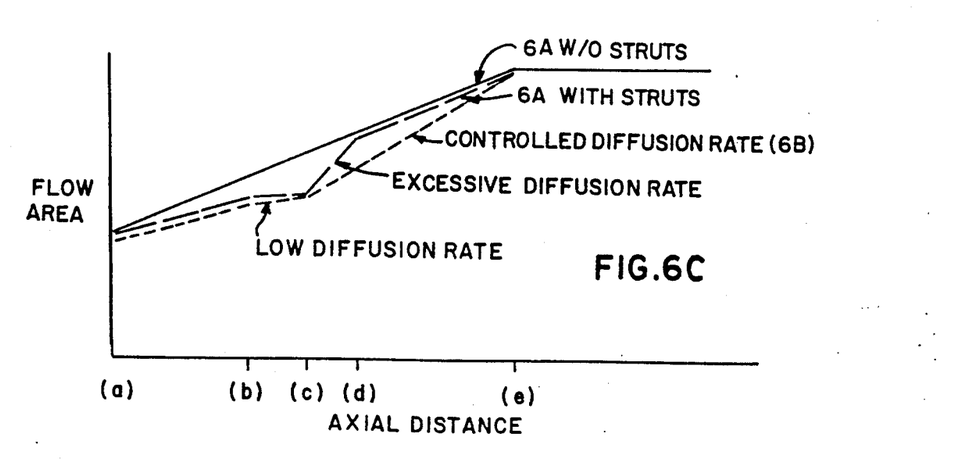

The diffuser flow splitting, controlled diffusion rate, and chute blockage advantages of the invention may be further understood by referring to FIGS. 6A, 6B and 6C. FIG. 6A shows a typical diffuser shape, e.g. diffuser 175, with the addition of typical airfoil-shaped support struts. It can be readily noted that the diffusion rate (or gas deceleration) would be relatively uniform except for the insertion of the support struts. The addition of the support struts causes a local gas stream blockage, hence, a reduction in the diffusion rate up to the point of maximum support structure thickness (i.e. axial station (c)). In the strut section form the maximum thickness point (c) to the strut trailing edge (d), it is noted that the area change is abruptly large. Such a locally high diffusion rate can promote flow separation, hence, reduction in performance because of increased pressure losses.

The diffusion rate is undesirably high because the flow area is diverging in two directions by virtue of the diverging inner and outer walls and additionally because of the reduction in cross section area radially between struts as shown in the top view of FIG. 6A.

In the case of the proposed configuration in FIG. 6B, the addition of the chutes 75 can substantially eliminate the local excessive diffusion by virtue of the axially shaped blockage of the chutes 75 in the region between (c) and (d). Then the introduction of the cooling flow from the chutes 75 fills the region downstream of the chutes 75 to aerodynamically streamline the chute 75. That is, the abrupt increase in flow area at the chute discharge plane may be effectively nullified by the cooling air discharge which fills the region. The introduction of such cooling air is analogous to having an extended chute 75, as shown in dashed line in FIG. 6B.

It can be observed, therefore, and is illustrated in FIG. 6C, that the addition of the chutes 75 performs a diffuser splitting function (streams 1 and 2 of FIG. 6B), and the physical shape of the chutes 75 reduces the excessive diffusion rate in the aft section of the support 37. FIG. 6C illustrates flow area versus axial distance with the diffuser 175 of FIG. 6A with and without fairings/struts. Without the struts, a linear rate of diffusion is obtained between points (a) and (e). With the struts the diffusion rate is affected between points (b) and (d) corresponding to the leading and trailing edges. Adding chutes 75 to the struts results in the structure illustrated in FIG. 6B and the controlled rate of diffusion illustrated in FIG. 6C. This avoids the excessive diffusion rate between points (c) and (d) as illustrated in FIG. 6C.

This also avoids additional streamlining structure which would be imposed on the chutes 75 (e.g. dashed lines in FIG. 6B), which would lengthen the diffuser in the axial direction if the flow stream were not otherwise present. In this way, the chute 75 may be analogized to a daisy mixer combining the relatively cool compressor discharge air with turbine discharge gas.

From the foregoing, it can be seen that enhanced engine performance is made possible by an air-cooled aft engine support member which includes aerodynamic members which improve the aerodynamic performance of the diffuser in which the support member is located while also being made more durable by air cooling. Moreover, the airflow through the support member is further used to preferentially cool downstream gases as well as downstream members so as to enhance the durability of the downstream members, reduce their IR profile and also increase flashback margin of an afterburner.

While there have been described what are considered to be preferred embodiments of the invention, other modifications may occur to those having ordinary skill in the art. It is intended to cover all such modifications as would fall within the true spirit and scope of the claims.

What is claimed is:

1. A gas turbine engine of the type having generally cylindrical casings defining concentric bypass air and turbine discharge passages, and further comprising:
   a support within the turbine discharge passage comprising an outer ring and an inner ring connected by a plurality of radially extending members, said radial members being positioned between members defining a flow channel for turbine discharge gases, each of the members including a hollow inner chamber;

means for delivering a supply of cooling air to the hollow inner chamber of each of the radial members; and, means for discharging the cooling air from the radial members solely into an annulus spaced from and between said flow channel defining members for cooling a downstream engine member.

2. The engine recited in claim 1 wherein the means for discharging cooling air includes a discharge chute mounted on at least one of the radial members, the chute having a substantially greater circumferential width than radial height; and, the chute being in fluid communication with the hollow inner chamber of its respective radial member and including at least one flow channel for discharging air in a downstream direction.

3. A gas turbine engine according to claim 2 further including a plurality of said discharge chutes, each being mounted on a respective one of said radial members, said chutes collectively providing an annular flow pattern of cooling air for cooling said downstream member.

4. The engine recited in claim 2 wherein the means for delivering a supply of cooling air to the hollow inner chamber of each of the radial members include at least one scoop positioned in the bypass air passage for channeling air to the hollow inner chambers of each of the radial members.

5. The engine recited in claim 3 wherein the downstream engine member is an annular flameholder.

6. A support structure for a gas turbine engine of the type having generally cylindrical casings defining cooling air bypass and turbine discharge passages, the support comprising:

a fairing having a hollow inner chamber and being positionable between members defining a flow channel for turbine discharge gases;

a discharge chute formed with the fairing and disposed generally perpendicular thereto and spaced from and between said flow channel defining members, the discharge chute being in fluid communication with the inner chamber.

7. The support structure recited in claim 6 wherein the fairing is adapted for fluid communication with the cooling air bypass passage and further includes a hollow inner structural member disposed within the inner chamber.

8. The support structure recited in claim 6 wherein the fairing is adapted for fluid communication with the bypass passage, the fairing further comprising:

at least one baffle disposed in the inner chamber for directing cooling air through the inner chamber to the discharge chute.

9. The support structure recited in claim 8 wherein there is an upstream baffle and a downstream baffle disposed in the inner chamber for directing cooling air through the inner chamber to the discharge chute, the support structure further comprising:

a plurality of discharge channels formed in the discharge chute in fluid communication with the inner chamber for providing lateral distribution of the cooling air.

10. The support structure recited in claim 9 wherein said discharge channels include a pair of laterally outer channels farthest from the fairing; a pair of inner channels closest to the fairing and a pair of middle channels between the outer and inner channels; and wherein the outer channels are in fluid communication with the upstream side of the upstream baffle and the middle channels are in fluid communication with the air between the upstream and downstream baffles, and the inner channels are in fluid communication with the downstream side of the downstream baffle.

11. The support structure recited in claim 9 further comprising a plurality of bleed holes in the trailing edge of the outer member, the bleed holes being in fluid communication with the downstream side of the downstream baffle.

12. A support structure for a gas turbine engine of the type having generally cylindrical casings defining concentric bypass air and turbine discharge passages, the support structure comprising:

an outer ring and an inner ring connected by a plurality of radially extending members, said radial members being positionable between members defining a flow channel for turbine discharge gases; and, a wing member formed with each radial member and disposed generally perpendicular thereto and spaced from and between said flow channel defining members for controlling diffusion rate of flow through said support structure.

13. A support structure according to claim 12 wherein said radial members comprise fairings, each including a hollow inner chamber, and said wing member comprises a discharge chute being in fluid communication with said inner chamber.

14. The support structure recited in claim 13 wherein each fairing is adapted for fluid communication with the bypass air cooling air passage and further comprises a hollow inner structural member disposed within the inner chamber.

15. The support structure recited in claim 13 wherein each fairing is adapted for fluid communication with the bypass cooling air passage, each fairing further comprising an upstream baffle and a downstream baffle disposed in each fairing inner chamber for directing cooling air through the inner chamber to the discharge chute; and a plurality of discharge channels formed in the discharge chute in fluid communication with the inner chamber for providing lateral distribution of the discharge air.

16. The support structure recited in claim 15 wherein each discharge chute includes a pair of laterally outer channels farthest from the fairing; a pair of laterally inner channels closest to the fairing and a pair of middle channels between the outer and inner channels; and, wherein the outer channels are in fluid communication with the upstream side of the upstream baffle, the middle channels are in fluid communication with the air between the upstream and downstream baffles, and the inner channels are in fluid communication with the downstream side of the downstream baffle.

17. The support structure recited in claim 16 wherein each fairing further includes a plurality of bleed holes in the trailing edge of the fairing, the bleed holes being in fluid communication with the downstream side of the downstream baffle.

18. A gas turbine engine comprising:

an annular outer casing;

an annular inner casing spaced radially inwardly from said outer casing for defining a bypass duct therebetween;

a compressor disposed in said outer casing and upstream of said inner casing;

a gas generator disposed in said inner casing and downstream of said compressor;

said compressor being in flow communication with both said bypass duct and said gas generator;

an annular support disposed in an aft end of said inner casing and in flow communication with said gas generator for supporting a rotor component of said gas generator, said annular support comprising:

an outer ring;

an inner ring spaced radially inwardly of said outer ring and defining a diffuser therebetween for diffusing gases discharged into said diffuser from said gas generator;

a plurality of circumferentially spaced supporting struts extending between said inner and outer rings;

a plurality of hollow fairings extending between said inner and outer rings;

each of said fairings being spaced around a respective one of said struts for defining a chamber therebetween, said chamber being in flow communication with said bypass duct; and means for discharging air from said chamber of said fairing in a downstream direction.

19. A gas turbine engine according to claim 18 wherein said discharging means comprises a laterally extending chute disposed on at least one of said fairings and in flow communication therewith.

20. A gas turbine engine according to claim 19 wherein said fairings have a leading edge, a wide section of maximum width and a trailing edge, and said chute is disposed between said wide section and said trailing edge to decrease the rate of diffusion from said wide section to said trailing edge.

21. A gas turbine engine according to claim 20 wherein said chute is delta shaped having a width increasing in a downstream direction.

22. A gas turbine engine according to claim 21 wherein said chute includes a plurality of spaced channels for discharging air from said chute.

23. A gas turbine engine according to claim 22 wherein each of said fairings includes one of said chutes for collectively discharging an annulus of cooling air in a downstream direction.

24. A gas turbine engine according to claim 23 further including an after disposed downstream of and in flow communication with said support, said afterburner including an annular flameholder radially aligned with said cooling air annulus dischargeable from said chutes, said chutes providing cooling air to cool said flameholder and gas generator discharge gases flowable thereover.

25. A gas turbine engine according to claim 24 wherein said downstream ends of said chutes extend on each side of said fairings for one-third the distance between adjacent fairings.

26. A gas turbine engine according to claim 25 wherein said fairings further include upstream and downstream baffles therein for defining a circuitous flowpath for air channeled into said chamber of said fairing.

27. A gas turbine engine according to claim 26 wherein said fairings include trailing edge bleed holes for discharging a portion of air channeled into said chambers, with the remainder of said air being channeled through apertures in said fairing and into said channels of said chutes.

28. A gas turbine engine comprising:

a gas generator for discharging combustion gases;

an afterburner for receiving said combustion gases, said afterburner including a flameholder and fuel pipes; and means disposed upstream of said flameholder and fuel pipes for discharging cooling air as a stratified annulus into said combustion gases for cooling said gases and said flameholder to prevent flashback in said afterburner.

29. A gas turbine engine according to claim 28 wherein said discharging means comprises an annular support disposed between said gas generator and said flameholder, said support comprising a plurality of circumferentially spaced concentric support struts and fairings extending in a radial direction, each of said fairings including a chute facing in a downstream direction, said chute being in flow communication with a space formed between said fairing and said strut and with means for supplying cooling air thereto, said chutes having trailing edge apertures radially aligned with said flameholder for directing an annulus of cooling air thereto.

* * * * *